United States Patent Office 3,748,270

Patented July 24, 1973

3,748,270

METHOD OF PREPARING COBALT DOPED MAGNETIC IRON OXIDE PARTICLES

Paul Y. Hwang, Palo Alto, Calif., assignor to Ampex Corporation, Redwood City, Calif.

No Drawing. Filed Oct. 27, 1971, Ser. No. 193,155
Int. Cl. C01g *49/06;* C04b *35/00*
U.S. Cl. 252—62.56 6 Claims

ABSTRACT OF THE DISCLOSURE

High coercivity cobalt doped magnetic iron oxide particles are made by doping an iron oxide with cobalt, converting the material to a cobalt doped gamma ferric oxide containing a small amount of divalent iron at a high temperature and slow cooling the hot material in an inert atmosphere.

SUMMARY OF THE INVENTION

Gamma ferric oxide is the most common material for use in making magnetic recordings. This material has a relatively low coercivity and thus a poor short wavelength response and undesirably low saturation moment and remanence. It is known to dope gamma ferric oxide with cobalt to increase its coercivity and the present invention relates to a doping process wherein there is a maximum increase in coercivity for a given amount of cobalt. Since cobalt is a relatively expensive material, it is the primary object of the present invention to achieve the greatest efficiency in the cobalt doping so that a minimum amount of cobalt is employed to achieve a desired degree of coercivity. The product of the present invention is equal in quality to the cobalt doped gamma ferric oxide containing a considerably larger quantity of cobalt, yet it is less expensive.

In accordance with the present invention it has been found that after the cobalt doped iron oxide is partly converted to gamma ferric oxide containing a small amount of divalent iron at a relatively high temperature the coercivity is greatly enhanced for a given amount of cobalt if it is cooled slowly to a temperature of about 100° C.

Although this invention is not predicated on any theory of its operation, it is believed that the high coercivity of a cobalt doped iron oxide is due to the high contribution of $Co^{++}$ to the magnetic anisotropy. It is known that $Fe^{++}$ has a higher contribution to magnetic anisotropy than $Fe^{+++}$. Hence, for the same cobalt doping level, an oxide containing a suitable percentage of $Fe^{++}$ would expect to have a higher coercivity than an oxide with all iron ions in ferric state ($Fe^{+++}$). Also, in ferrite crystals, strain anisotropy disturbs the cubic anisotropy and lowers the coercivity. Therefore, another way to increase coercivity of a cobalt doped oxide is to release the internal stress of the crystals due to the high temperature process by cooling the material from the high temperature to a low temperature slowly in a controlled manner in an inert atmosphere.

Surprisingly, it has been found that the slow cooling of the present invention has little effect in the absence of $Fe^{++}$ and no effect whatsoever in the absence of cobalt, either with or without the presence of divalent iron.

Various starting materials can be used in carrying out the technique of the present invention. Regardless of the starting material, one ends up with a cobalt doped gamma ferric oxide containing divalent iron at an elevated temperature of at least 250° C. and possibly as high as 600° C. and this material is then cooled in an inert atmosphere at a rate not exceeding 10° C. per minute and preferably one or two degrees per minute until the material is cooled. By cool is meant a temperature of about 100° C. since no substantial change takes place in the material after it has achieved a temperature of 100° C. and is then brought down to room temperature.

If FeOOH is employed as a starting material it can be mixed with a suitable cobalt compound and then converted to gamma ferric oxide in a known manner or the FeOOH can first be dehydrated to alpha ferric oxide. Alpha ferric oxide can be treated with suitable cobalt compound and heated to decompose the cobalt compound forming a cobalt coated alpha ferric oxide which is then reduced to magnetite and at least partly reoxidized again to ferric oxide in known manner.

Magnetite ($Fe_3O_4$) may be employed as the starting material in which case it is first partly oxidized to gamma ferric oxide which can be slurried with the cobalt salt, dried and heated to decompose the cobalt salt to the metal or oxide form in an inert atmosphere. Gamma ferric oxide containing a small amount of divalent iron may be employed as a starting material in which case it is only necessary to slurry it with a cobalt salt, dry it and decompose the cobalt salt in an inert atmosphere to produce the desired cobalt doped gamma ferric oxide but in all instances the hot cobalt doped gamma ferric oxide and divalent iron is cooled in an inert atmosphere in a controlled manner to achieve the purposes of the present invention.

In carrying out the present invention, the cobalt doping level should be from about 0.5 to 25 atomic percent, based on the iron present and preferably the percentage is from 1.0 to 20 atomic percent. Most of the iron present will, of course, be in the trivalent form as gamma ferric oxide but from ½ to 30% and preferably from 1 to 25 atomic percent of the iron will be in the divalent form.

DESCRIPTION OF THE PREFERRED EMBODIMENTS

The following is a brief description of the process which applies the forementioned principles to improve coercivities of cobalt doped iron oxide.

The starting material is an iron oxide of suitable particle size and shape. Preferably, it is a yellow iron oxide ($\alpha$-FeOOH) or red oxide ($\alpha$-$Fe_2O_3$). The particles preferably have a length of from 0.01 to 2.00 microns and a width of from 0.007 to 1.00 micron. Preferably, the aspect ration, i.e., the ratio of the length to width is at least 3 to 1.

Since acicular alpha FeOOH serves commercially as the starting material for acicular alpha $Fe_2O_3$, $Fe_3O_4$ and gamma $Fe_2O_3$ manufacturing therefore, it is the preferred starting material in this invention.

A cobalt oxide or any cobalt compound which can be decomposed into a cobalt oxide or cobalt metal at a temperature below 600° C. can be employed in the process to supply the required cobalt. This includes cobaltous hydroxide, formate, acetate, nitrate, chloride, etc. However, for doping uniformity, a water soluble cobalt salt or a freshly precipitated gel is preferred.

Acicular iron oxide particles are mixed with a cobalt salt solution to provide a desired percentage of cobalt doping. Many conventional solid-liquid mixing methods can be used to carry out this operation. To achieve more uniform mixing, a slurry containing iron oxide particles and a soluble cobalt salt can be spray-dried together.

The third method to achieve good distribution of cobalt on iron oxide particles is to mix iron oxide with a freshly precipitated cobaltous hydroxide gel. The colloidal cobaltous hydroxide particles will be thus uniformly adsorbed on the surface of the iron particles.

The resulting iron oxide and cobalt salt mixture is dried and heated in air to a tempertaure at least 250° C. but below 600° C. and preferably 250 to 500° C. to decompose the cobalt salt to a cobalt oxide or cobalt metal. If alpha FeOOH is used as the starting mateiral, this step will dehydrate it to alpha $Fe_2O_3$ also. The next step is to reduce alpha $Fe_2O_3$ to $Fe_3O_4$ in an atmosphere containing $H_2$ or CO at a temperature between 150° C. and 600° C.

In order to improve the doping efficiency, the cobalt doped $Fe_3O_4$ is oxidized at a relatively high temperature, between 250 and 600° C., preferably between 350 and 500° C. Since the oxidation reaction is highly exothermic, a fast reaction will raise the local temperature to above 600° C. A temperature exceeding 600° C. will either sinter the particles or change the magnetic gamma ferric oxide back to the non-magnetic form alpha ferric oxide and defeat the purpose. In order to control the reaction rate, the $O_2$ in the air is diluted by mixing with a suitable amount of an inert gas such as $N_2$. After the material is oxidized to a composition containing a suitable percentage of FeO, it is cooled in an inert atmosphere from the reaction temperature to below 100° C. slowly under a controlled rate to release the internal stress of the crystals.

The following non-limiting examples illustrate preferred embodiments of the invention:

EXAMPLE 1

Thirty-five hundred grams of alpha FeOOH with an average particle size of 0.6μ in length and 0.1μ in width and a suitable amount of $Co(NO_3)_2 \cdot 6H_2O$ to give a desired level of cobalt doping were placed in a 120-liter tank equipped with a turbine agitator to disperse the powder to a smooth slurry and to dissolve the cobalt salt. A 0.5 N NaOH solution was introduced at a rate of approximately 3-liter per hour to complete the precipitation of cobalt as $Co(OH)_2$. The $Co(OH)_2$ thus formed was uniformly adsorbed on the surface of alpha FeOOH particles. The slurry was filtered and washed to remove the soluble salt $NaNO_3$. The filter cakes were dried in an oven and pulverized to a fine powder.

Seven-hundred fifty gram batches of the dry powder were placed in a laboratory batch rotary kiln. The kiln was heated to 370° C. to dehydrate alpha FeOOH and $Co(OH)_2$. The kiln temperature was then reduced to 320° C. and $H_2$ at a flow rate of 5 SCFH (standard cubic feet per hour), was introduced into the kiln to reduce alpha—$Fe_2O_3$ to $Fe_3O_4$. A mixture of 1.2 SCFH air and 1.2 SCFH of $N_2$ was admitted to the kiln to partially oxidize the $Fe_3O_4$ to gamma $Fe_2O_3$ at 375° C. When the composition reached the desired percent FeO, the kiln was purged with $N_2$ to stop the oxidation reaction. Then the kiln was cooled to below 100° C. at a rate of about 2° C. per minute.

The following are magnetic properties of products with various atomic percentages of Co and atomic percentages of FeO.

| Atomic percent | | | emu/g. | |
|---|---|---|---|---|
| Co | FeO | Hc, oe. | $\sigma_s$ | $\sigma_r$ |
| 1.7 | 17 | 620 | 81 | 40.5 |
| 1.7 | 10 | 577 | 81 | 41.3 |
| 1.7 | 5 | 547 | 76.5 | 39.8 |
| 1.7 | 0.1 | 420 | 72.5 | 38.2 |
| 3.5 | 14.1 | 875 | 83.1 | 44.0 |
| 3.5 | 10.3 | 850 | 79.0 | 46.8 |
| 3.5 | 7.6 | 878 | 77.1 | 46.2 |
| 3.5 | 0.1 | 520 | 71.0 | 42.5 |
| 3.5 | 14.1 | 875 | 83.1 | 44.0 |
| 3.5 | 10.3 | 850 | 79.0 | 46.8 |
| 3.5 | 7.6 | 878 | 77.1 | 46.2 |
| 3.5 | 0.1 | 520 | 71.0 | 42.5 |
| 9.0 | 18.0 | 2,170 | 76.0 | 39.5 |
| 9.0 | 12.0 | 1,960 | 73.5 | 40.4 |
| 9.0 | 6.5 | 1,670 | 69.0 | 41.4 |
| 9.0 | 0.1 | 1,216 | 69.0 | 41.4 |
| 12.8 | 18.7 | 1,840 | 67.6 | 35.2 |
| 12.8 | 14.1 | 2,820 | 70.6 | 38.2 |
| 12.8 | 8.3 | 2,550 | 68.0 | 40.8 |
| 12.8 | 0.1 | 1,670 | 68.4 | 44.5 |
| 17.0 | 26.0 | 1,287 | 69.4 | 36.8 |
| 17.0 | 13.2 | 1,680 | 62.5 | 34.1 |
| 17.0 | 1.0 | 1,320 | 62.8 | 40.0 |

EXAMPLE 2

The process in this example is similar to that in Example 1, except that the cooling rates were changed to illustrate the influence of cooling rate on coercivity.

| Atomic percent | | Time from 350° C. to 100° C., minutes | Hc, oe. | emu/g. | |
|---|---|---|---|---|---|
| Co | FeO | | | $\sigma_s$ | $\sigma_r$ |
| 3.5 | 7.6 | 1 | 673 | 78.6 | 45.6 |
| 3.5 | 7.6 | 25 | 821 | 78.5 | 47.1 |
| 3.5 | 7.6 | 149 | 878 | 77.1 | 46.2 |
| 9.0 | 16.0 | 1 | 1,130 | 75.5 | 40.1 |
| 9.0 | 18.5 | 15 | 1,430 | 76.1 | 40.3 |
| 9.0 | 18.0 | 155 | 2,170 | 76.0 | 39.5 |

EXAMPLE 3

Fifty pounds of alpha FeOOH of the same particle size as in Example 1, were mixed in 200 lbs. of water containing a suitable amount of previously dissolved $Co(C_2H_3O_2)_2$ to a homogenous slurry. The mixture was spray dried in a Nichols Utility Spray Dryer. The dry powder was converted to a series of cobalt doped iron oxides in the same manner as with Example 1, except that a slightly faster cooling rate of 5° C./minute was used.

| Atomic percent | | | emu/g. | |
|---|---|---|---|---|
| Co | FeO | Hc, oe. | $\sigma_s$ | $\sigma_r$ |
| 3.35 | 18.0 | 865 | 78.9 | 38.7 |
| 3.35 | 16.7 | 865 | 78.9 | 41.0 |
| 3.35 | 5.9 | 816 | 71.4 | 41.4 |
| 3.35 | 0.4 | 525 | 72.5 | 39.1 |
| 5.6 | 17.1 | 1,384 | 75.5 | 41.5 |
| 5.6 | 8.3 | 1,195 | 71.7 | 43.7 |
| 5.6 | 0.5 | 934 | 67.3 | 43.8 |

EXAMPLE 4

Four-hundred sixty-five grams of $Co(NO_3)_2 \cdot 6H_2O$ were dissolved in 2 liters of water. This was mixed in a Simpson muller with 3000 grams of alpha $Fe_2O_3$ obtained from dehydration of alpha FeOOH of the same particle size as in Examples 1 to 3. The mixture was oven-dried and pulverized to fine powder. It was converted to a series of cobalt doped iron oxides with the same process described in Example 1, except that a mixture of 1.2 SCFH air and 2.4 SCFH $N_2$ was used to oxidize the $Fe_3O_4$ at 400° C. and the kiln was cooled to below 100° C. in $N_2$ at a rate of 3° C./minute.

| Atomic percent | | | emu/g. | |
|---|---|---|---|---|
| Co | FeO | Hc, oe. | $\sigma_s$ | $\sigma_r$ |
| 4.0 | 20.1 | 870 | 84.0 | 45.0 |
| 4.0 | 14.2 | 952 | 82.9 | 45.6 |
| 4.0 | 10.5 | 972 | 80.7 | 46.0 |
| 4.0 | 6.5 | 965 | 76.8 | 46.5 |
| 4.0 | 0.8 | 602 | 70.8 | 42.7 |

The above examples show that the preferred chemical compositions are between 1.0 and 20.0 atomic percent cobalt and 1.0 to 25.0 atomic percent FeO, and the preferred cooling rate is not faster than 10° C./minute.

I claim:

1. The method of improving the coercivity of a cobalt doped gamma ferric oxide wherein said cobalt doped gamma ferric oxide contains divalent iron and has from 0.5 to 25 atomic percent cobalt and from 0.5 to 30 atomic percent divalent iron, both percentages being based on the metallic iron content of said gamma ferric oxide, wherein said cobalt doped gamma ferric oxide is formed at a temperature of about 250 to 650° C. from an iron oxide-cobalt salt mixture by a series of steps including reduction and reoxidization, comprising cooling the hot cobalt doped gamma ferric oxide to a temperature of about 100° C. in an inert atmosphere, said cooling being achieved at a rate of not more than about 10° C. per minute.

2. The process of claim 1 wherein the iron oxide is selected from alpha FeOOH and alpha $Fe_2O_3$.

3. The process of claim 2 wherein the iron oxide is mixed with a cobaltous hydroxide gel.

4. The process of claim 2 wherein the iron oxide is mixed with a solution of a soluble cobalt salt and dried.

5. The process of claim 4 wherein the drying is by spray drying.

6. The process of claim 1 wherein the gamma ferric oxide contains from 1 to 20 atomic percent cobalt and from 1 to 25 atomic percent divalent iron.

References Cited

UNITED STATES PATENTS

| | | | |
|---|---|---|---|
| 3,075,919 | 1/1963 | Gruber et al. | 252—62.56 X |
| 3,117,933 | 1/1964 | Abeck et al. | 252—62.56 |

| | | | |
|---|---|---|---|
| 3,243,375 | 3/1966 | Jeschke | 252—62.56 |
| 3,573,980 | 4/1971 | Haller et al. | 252—62.56 X |

FOREIGN PATENTS

| | | | |
|---|---|---|---|
| 664,086 | 1/1952 | Great Britain | 252—62.56 |

OSCAR R. VERTIZ, Primary Examiner

J. COOPER, Assistant Examiner

U.S. Cl. X.R.

252—62.55